MAJOR H. E. BECKLEY.
GEOGRAPHICAL GLOBE.
APPLICATION FILED MAR. 30, 1921.
1,419,604.
Patented June 13, 1922.
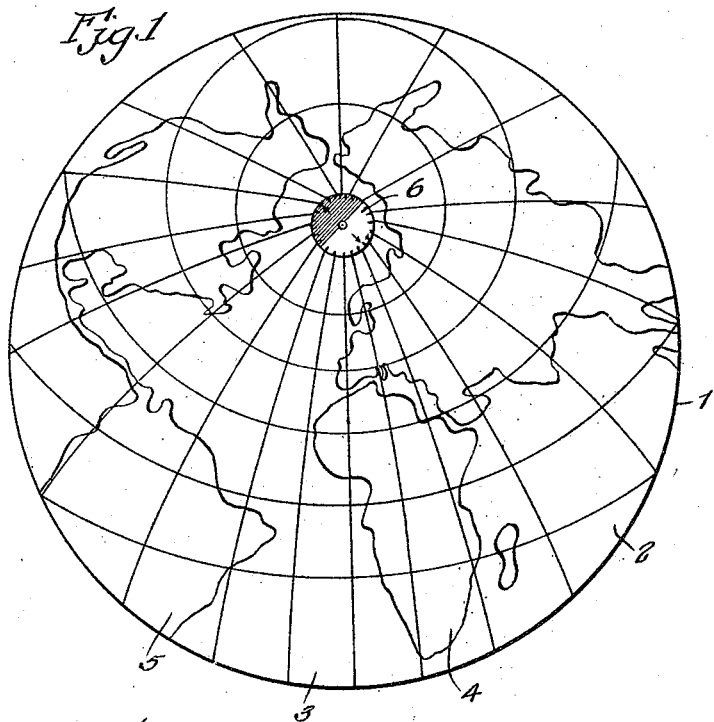
Fig. 1
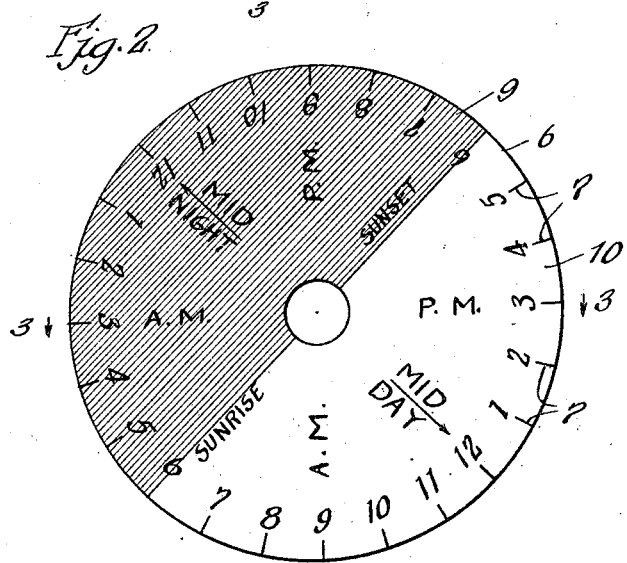
Fig. 2
Fig. 3
Witness.
Carl G. Anderson.
Inventor.
Major H. E. Beckley.
By. A. Miner Belfield Atty.

UNITED STATES PATENT OFFICE.

MAJOR H. E. BECKLEY, OF CHICAGO, ILLINOIS, ASSIGNOR TO A. J. NYSTROM & CO., OF CHICAGO, ILLINOIS, A CORPORATION OF ILLINOIS.

GEOGRAPHICAL GLOBE.

1,419,604.  Specification of Letters Patent.  Patented June 13, 1922.

Application filed March 30, 1921. Serial No. 456,930.

*To all whom it may concern:*

Be it known that I, MAJOR H. E. BECKLEY, a citizen of the United States, residing at Chicago, in the county of Cook and State of Illinois, have invented a certain new and useful Improvement in Geographical Globes, of which the following is a full, clear, concise, and exact description, reference being had to the accompanying drawings, forming a part of this specification.

My invention relates to geographical globes, especially such as are adapted for use in schools and other educational institutions.

One of the objects of the invention is to provide a geographical globe which will show not only the geographical features of the earth, the oceans, continents and so on, but will also show the different hours of the twenty-four hour period of the earth's day, at the different points on the earth's surface.

Another object of the invention is to permit this result to be accomplished, either in new globes or in globes already in use, and in a very simple manner and at very low expense.

In carrying out my invention I provide a geographical globe with a device located near one polar extremity provided with means for indicating the different hours of the day and night. This device is so situated and arranged that the means for indicating the different hours are at meridian points on the globe so that by following meridian lines, the absolute or relative time at any place on the earth's surface may be determined.

In the accompanying drawings Fig. 1 is a view of a geographical globe equipped with a time indicating device embodying my present invention;

Fig. 2 is a plan view of such device by itself; and

Fig. 3 is a cross sectional view taken on line 3—3 in Fig. 2.

Referring to the drawings I show a geographical globe 1 showing the geographical features of the earth, as for example, oceans 2 and 3, and continents 4 and 5.

At the north pole extremity of this globe I show a time indicating device 6 embodying my present invention. As shown best in Fig. 2 this device is preferably circular and has its circumference divided into twenty-four parts marked by lines or points 7—7, there being two sets of the same each running from 1 to 12, inclusive. One-half of the device is preferably shaded so as to be very dark or black, as at 9, and the other half is left or made light, as at 10. The diameter separating these two shaded halves runs through the figures indicating the hours, 6—6. Thus one-half represents what may be called day and the other half night. The intervening figures are marked accordingly.

This device 6 may be in the form of a separate member, as for example, a circular metal plate, and may be secured to the pole of the globe in any desired manner, so that it will be held rigidly in position and when in that position the time of the twenty-four hours of the day will be indicated and by extending down from the lines 7—7 the time at any point on the earth's surface may be obtained. If the device is rigidly fixed to the globe, of course the absolute hours will be indicated correctly only when the earth is in the position with the midday point of the device toward the sun. At other times the time will have to be computed. Instead of having a separate device secured to the pole of the globe, the substance of the device 6 could be made as part of the globe map itself. The advantage, however, of having the device made separately is that it can be applied to globes in any desired position, as they are being manufactured, and also can be applied to globes already in use. For such purpose the devices can be made and sold separately.

It will be understod that changes and modifications may be made without departing from the spirit of the invention.

What I claim is:

In combination, a geographical globe having polar extremities, a dial mounted directly upon the globe near one of its polar extremities, said dial being substantially concavo-convex in cross section for snugly embracing the globe surface, and a circumferential series of spaces on the dial corresponding to the time in hours of a civil day, and having a substantially half portion thereof shaded.

In witness whereof, I hereunto subscribe my name this 5th day of February, A. D., 1921.

MAJOR H. E. BECKLEY.